(12) United States Patent
Tanguy et al.

(10) Patent No.: US 11,219,875 B2
(45) Date of Patent: Jan. 11, 2022

(54) DEVICE FOR THE SYNTHESIS OF A RADIOTRACER, FACILITY COMPRISING SUCH A DEVICE, AND METHOD FOR PRODUCING A RADIOTRACER BY MEANS OF SUCH A DEVICE

(71) Applicant: PMB, Peynier (FR)

(72) Inventors: Laurent Tanguy, Aix en Provence (FR); Jerome Corneille, Luynes (FR); Bertrand Loubaton, Sceaux (FR); Marc Delmas, Bouc-Bel-Air (FR); Alain Perez Delaume, Brignoles (FR)

(73) Assignee: PMB, Peynier (FR)

( * ) Notice: Subject to any disclaimer, the term of this patent is extended or adjusted under 35 U.S.C. 154(b) by 677 days.

(21) Appl. No.: 15/565,740

(22) PCT Filed: Apr. 14, 2016

(86) PCT No.: PCT/FR2016/050872
§ 371 (c)(1),
(2) Date: Oct. 11, 2017

(87) PCT Pub. No.: WO2016/166486
PCT Pub. Date: Oct. 20, 2016

(65) Prior Publication Data
US 2018/0071704 A1    Mar. 15, 2018

(30) Foreign Application Priority Data

Apr. 16, 2015  (FR) .................................. 1553402

(51) Int. Cl.
*B01J 19/00* (2006.01)
*C07B 59/00* (2006.01)
*G21G 4/08* (2006.01)

(52) U.S. Cl.
CPC .......... *B01J 19/004* (2013.01); *B01J 19/0093* (2013.01); *C07B 59/00* (2013.01); *G21G 4/08* (2013.01)

(58) Field of Classification Search
CPC . B01J 19/04; B01J 19/08; B01J 19/081; B01J 2219/00927; B01J 19/004;
(Continued)

(56) References Cited

U.S. PATENT DOCUMENTS

| 2012/0283490 A1* | 11/2012 | Gangadharmath | ...... B01J 4/008 |
| | | | 570/153 |
| 2013/0020727 A1 | 1/2013 | Klausing et al. | |
| 2015/0086476 A1* | 3/2015 | Eriksson | .................. B01J 19/00 |
| | | | 424/1.11 |

FOREIGN PATENT DOCUMENTS

| WO | 2005/072353 A2 | 8/2005 |
| WO | 2013/079578 A1 | 6/2013 |

OTHER PUBLICATIONS

Office Action in Chinese Patent Application No. 201680022828.4 dated May 21, 2019 with English translation provided.
(Continued)

*Primary Examiner* — Jill A Warden
*Assistant Examiner* — Dwayne K Handy
(74) *Attorney, Agent, or Firm* — Nixon & Vanderhye

(57) ABSTRACT

Disclosed is a device for the synthesis of a radiotracer, including a universal confined enclosure designed for the insertion of a specific synthesis cassette of the radiotracer and the removal of same. The synthesis cassette includes a synthesis module designed to receive reagents and a radioisotope for the synthesis of the radiotracer. An inner connector plate includes at least one inlet, designed to be connected to a radioisotope admission and also to the inlet of the cassette, and an outlet, designed to be connected to a syringe to be filled with the radiotracer and also to the outlet
(Continued)

of the cassette. Such a synthesis device can be installed in a facility including, in a confined room, as well as such devices normally arranged in a storage area, a synthesis station, a radioisotope admission, at least one window for communication to the outside, and a manipulator robot.

21 Claims, 6 Drawing Sheets

(58) Field of Classification Search
CPC ..... C07B 59/00; C07B 59/002; C07B 59/005; C07B 2200/05
See application file for complete search history.

(56) References Cited

OTHER PUBLICATIONS

International Search Report, dated Aug. 31, 2016, from corresponding PCT/FR2016/050872 application.

* cited by examiner

DEVICE FOR THE SYNTHESIS OF A RADIOTRACER, FACILITY COMPRISING SUCH A DEVICE, AND METHOD FOR PRODUCING A RADIOTRACER BY MEANS OF SUCH A DEVICE

The present application concerns a device for synthesizing a radioactive tracer, an installation comprising such a device as well as a method of obtaining a radioactive tracer by means of such a device.

BACKGROUND OF THE INVENTION

Clinical molecular imaging, and especially Positron Emission Tomography (PET), is assuming an increasing role in medicine.

It contributes in particular to providing a personalized definition of the treatments best suited for each patient and to evaluating the therapeutic efficacy thereof.

However, the potential of this technology, in particular with the numerous tracers marked with fluorine-18 ($^{18}F$) and with carbon-11 ($^{11}C$), is not currently exploited fully in a clinical context and in research, due to the technical, logistic, organizational and economic constraints linked the very short half-life of these radio isotopes which are for example approximately 110 minutes for $^{18}F$ and 20 minutes for $^{11}C$.

Other difficulties are also linked to the complexity of the regulations for their implementation.

Their access is thus currently very limited.

SUMMARY OF THE INVENTION

One of the objectives of the present application is to provide an integrated system for producing radioactive tracers "on demand" for molecular imaging (PET), making it possible to broaden the clinical potential of molecular imaging by facilitating its access for preclinical and clinical research centers, and for hospitals.

The object of the present application is directed to an in situ installation without any major irradiation constraints actually inside the research centers and hospitals concerned. The use of radioisotopes with a very short half-life, for example such as carbon-11 ($^{11}C$), makes it possible to access a very broad range of bio-markers previously reserved for only a few centers in the world.

The object of the present application is directed to mitigating the aforementioned drawbacks at least in part.

To that end, according to a first aspect there is provided a device for synthesizing a radioactive tracer from a radioisotope characterized in that it comprises:

A universal confined chamber, comprising an internal connector plate, for example arranged in a wall of the chamber, and in which is provided an access door configured for insertion therein of a cassette for specific synthesis of the radioactive tracer and for its removal therefrom, The cassette for synthesis of the radioactive tracer, which comprises reagents and a synthesis module, the synthesis module comprising a reaction cell and being configured to receive the reagents and the radioisotope for synthesizing the radioactive tracer, the synthesis module being fluidically connected to an entry of the cassette that is configured for conveying the radioisotope into the reaction cell and an exit from the cassette configured for delivering the radioactive tracer out of the cassette, The internal connector plate, comprising at least one entry, configured to connect the entry of the cassette to an ingress of the radioisotope, and an exit, configured to be connected to the exit of the cassette and to extract the radioactive tracer from the chamber.

The entry and the exit of the connector plate thus form a radioisotope ingress and radioactive tracer exit between an outside of the chamber and an inside of the chamber, and even of the cassette.

In other words, the internal connector plate comprises at least one entry, configured to be connected to an ingress of the radioisotope and to be connected to the entry of the cassette, and an exit, configured to be connected to a syringe to fill with the radioactive tracer and to be connected to the exit of the cassette.

This amounts to saying that the internal connector plate comprises a so-called "entry" connector, and a so-called "exit" connector, the entry connector being configured to connect the entry of the cassette to an ingress of the radioisotope and the exit connector being configured to connect the exit of the cassette to a component for extracting the radioactive tracer, for example such as a syringe.

This implies that these connections are furthermore possible while the cassette remains in the chamber.

Thus, in other words, the internal connector plate enables a connection between the cassette, situated inside the chamber, and an outside of the chamber through a wall of the chamber.

Furthermore, the fact that the chamber comprises the internal connector plate, or even that a wall of the chamber comprises it, means that the internal connector plate comprises at least one part which constitutes part of the wall of the chamber.

Furthermore, a syringe here designates a device then enabling the radioactive tracer to be administered to a patient.

The radioisotopes considered here are preferably liquid or gaseous.

Thus, such a device makes it possible to synthesize different radioactive tracers by virtue of a chamber of universal architecture in which is disposed a cassette specific to the radioactive tracer to synthesize.

This chamber, taken without the cassette, constitutes a simple box for containing a cassette when a synthesis is to be carried out. It is worth noting that it is not necessary for the chamber to be shielded.

By way of indication, such a chamber measures of the order of the half meter in each of its three dimensions, that is to say in height, in width or in length; preferably 0.50 m at maximum.

According to an example embodiment, the device comprises a gas suction pipe, configured to pump out a gas contained in the chamber, preferably in the upper part of the device. For example, the gas suction pipe is fluidically connected to the connector plate of the device. At least part, or even all of the gas suction pipe, is preferably situated inside the chamber.

According to another example embodiment, the device comprises a clean gas injection pipe, configured to bring clean gas into the chamber in the lower part of the device. For example, the clean gas injection pipe is fluidically connected to the connector plate of the device. The injection of clean gas may simply result from the aforementioned gas suction. At least part, or even all of the clean gas injection pipe, is possibly situated inside the chamber.

According to an advantageous arrangement, the cassette comprises a module for pre-treatment of the radioisotope.

According to another advantageous arrangement, the device comprises a radioactive tracer purification module. For example, the radioactive tracer purification module comprises an HPLC column (HPLC standing for High Performance Liquid Chromatography). In an example embodiment, the radioactive tracer purification module is situated inside the chamber. Such a module is for example connected to the cassette via the internal connector plate. Such a module is for example mounted in series after the cassette.

According to an example embodiment, the device comprises an external system for managing the quality of air (or gas) in the chamber possibly using the aforementioned pipes.

The system for managing the quality of air in the chamber possibly comprises a pump configured to create a pressure reduction in the chamber and a pressure sensor configured to measure the pressure reduction.

The system for managing the quality of air in the chamber optionally comprises a flow rate measuring device upstream of the chamber and a flow rate measuring device downstream of the chamber which are configured to measure both a flow rate of gas which passes through the chamber and a pressure in the chamber.

The system for managing air in the chamber possibly also comprises a filter, for example of H14 type, upstream of the chamber and potentially downstream to avoid the propagation of population, configured to ensure Class A air purity.

The system for managing air in the chamber possibly comprises an independent measurement loop configured to perform a particular, possibly radiological, measurement of the air in the chamber. The measurement loop may comprise a particular counter configured to perform pumping out of the loop.

According to another aspect, there is also provided an installation for synthesis of at least one radioactive tracer comprising a synthesis device as described above and a confined room comprising:

An area for storage of at least two chambers of synthesis devices as described earlier, which are empty and identical, At least one window (preferably an airlock) for communication between an inside and an outside of the room configured for a practitioner to supply at least one cassette for synthesis of the radioactive tracer of the synthesis device, A manipulation robot configured at least to sample one of the chambers and the synthesis cassette, bring them onto a synthesis station and associate them to form the synthesis device, The synthesis station, fixed in the room and configured to receive the synthesis device, comprising an external connector plate that is configured to receive the internal plate of the chamber of the synthesis device, comprising at least one entry configured to convey a radioisotope into the synthesis cassette and an exit configured to connect thereto a syringe to fill with the radioactive tracer, that is to say a device enabling the radioactive tracer to be administered later, and An ingress of radioisotope coming from a source situated outside the room and connected to the entry of the external connector plate.

Coming from the source, the radioisotope passes through a supply pipe, in practice a small-diameter pipe or "capillary", which has a fixed connection to the connector plate of the synthesis station which is fixed in the room. The connector plate of the synthesis station is for example fixed in the room and is single.

The radioisotope source may, as indicated above, be a target holder associated with a cyclotron, but may also, in particular, be a generator (for example for $^{68}$Ga), or a provision of radioisotope generated elsewhere.

There are advantageously different windows (or different airlocks) for the insertion of the cassettes and any syringes to fill, and for the extraction of the radioactive tracers, preferably already contained by syringes.

In the particular case of use of carbon, there may be an intermediate module between the target holder and the connector plate of the synthesis station.

A chamber has just been fastened onto the connector plate of the synthesis station and, according to the cassette inserted into the selected chamber, a specific link is established between the connector plate of the synthesis post, and consequently with the supply pipe, and the cassette inserted into the chamber.

All the chambers for example are constituted identically even though in practice it is preferable, as a precaution, for each chamber to be dedicated to a particular radioactive tracer.

It is however possible to use a same radioisotope to synthesize different radioactive tracers. In such a case, it is possible as a variant to choose all the chambers dedicated to forming a radioactive tracer from a same radioisotope to be identical.

According to an example embodiment, the synthesis installation comprises an external module for quality control of the synthesized radioactive tracer.

The quality control module is for example fluidically connected to the exit of the connector plate of the synthesis station.

For regulatory reasons, such a quality control module is in practice installed outside the room; to have the quality control module as close as possible to a chamber in which a synthesis has just been carried out, this station is advantageously disposed outside the room opposite the synthesis station.

According to an advantageous example, the installation comprises a system for managing ambient air of the room, for example to maintain it in Class C.

According to still another aspect, there is provided a method for obtaining a radioactive tracer in an installation as described above, comprising the following steps:

A step of positioning a chamber of a synthesis device as described above on a synthesis station of the installation as described above by a manipulation robot;

A step of connecting an internal connector plate of the chamber of the device with an external connector plate of the synthesis station;

A step of inserting a cassette for specific synthesis of the radioactive tracer into the chamber of the synthesis device by the robot, the cassette being supplied in advance by a practitioner via a window of the installation, thus forming the synthesis device of the installation, the synthesis device comprising all or some of the features already described;

A step of providing a radioisotope conveyed from a source positioned outside a room of the installation into a synthesis module of the cassette;

A step of synthesizing a radioactive tracer in the synthesis module of the cassette from the radioisotope and from reagents contained in the cassette; and A step of extracting the radioactive tracer from the synthesis device.

The method possibly further comprises a step of sterilizing filtration and/or dilution/formulation of the radioactive tracer into a product injectable into humans, for example physiological saline solution.

According to a favored embodiment, the method further comprises:

A step of connecting a syringe, that is to say a device enabling the radioactive tracer to be administered later, at the exit of the external connector plate of the synthesis station, and A step of placing the radioactive tracer from the device into a syringe that is to say introduction into the device enabling the radioactive tracer to be administered later.

The method also advantageously comprises a step of quality control of the radioactive tracer at the exit from the external connector plate of the synthesis station by a quality control module situated outside the room.

BRIEF DESCRIPTION OF THE DRAWINGS

The invention, according to an example embodiment, will be well understood and its advantages will be clearer on reading the following detailed description, given by way of illustrative example that is in no way limiting, with reference to the accompanying drawings in which.

Identical parts represented in the aforementioned figures are identified by identical numerical references.

DETAILED DESCRIPTION OF THE PREFERRED EMBODIMENTS

Figure 1:
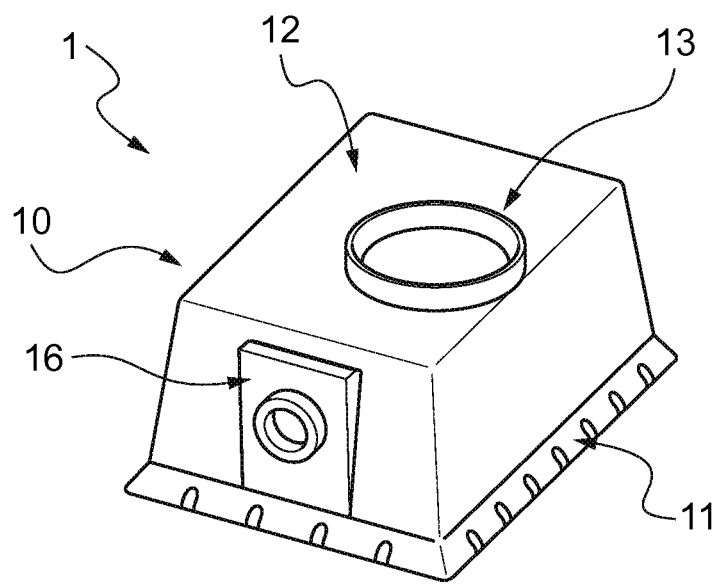
FIG. 1 shows an elevation view of a device for synthesis of a radioactive tracer according to an example embodiment of the present invention.

With reference to FIG. 1, a device for synthesis of a radioactive tracer 1 according to an example embodiment of the present invention comprises a chamber 10, or box, in which are disposed different components enabling the synthesis of the radioactive tracer.

The chamber 10 here has a generally parallelepiped shape and defines a fluid-tight and confined space, and is for example (but not necessarily) shielded. The chamber 10 for example measures at most 50 cm in each of its three dimensions, that is to say in height, in width or in length. It could also be cubic or cylindrical but a parallelepiped shape facilitates the storage of a plurality of such chambers in a storage or waiting area.

The chamber 10 is here formed by a mounting 11, forming for example a base of the chamber, and a cover 12.

The mounting 11 serves for example here to position at least the different components enabling the synthesis of the radioactive tracer.

The cover 12, here comprising a lateral wall and an upper face substantially opposite the mounting 11, is joined to the mounting 11, for example by being screwed thereto. Optionally, a seal (for example an 'O' ring), positioned on a periphery of the mounting 11 so as to be compressed on screwing the cover onto the mounting, enables that sealing to be reinforced.

The chamber 10 further comprises here an access door 13, formed by an opening 14 and a plug 15 (visible in particular in FIG. 3) enabling the opening 14 to be obturated or unblocked. The door 13 is configured for insertion of a cassette for synthesis of a radioactive tracer 30 (visible in FIG. 5) into the chamber 10 and removal of it therefrom.

In the present example embodiment, the access door 13 is provided in the upper face of the cover 12 of the chamber 10. However, it could of course be provided in the lateral wall.

Figure 9:
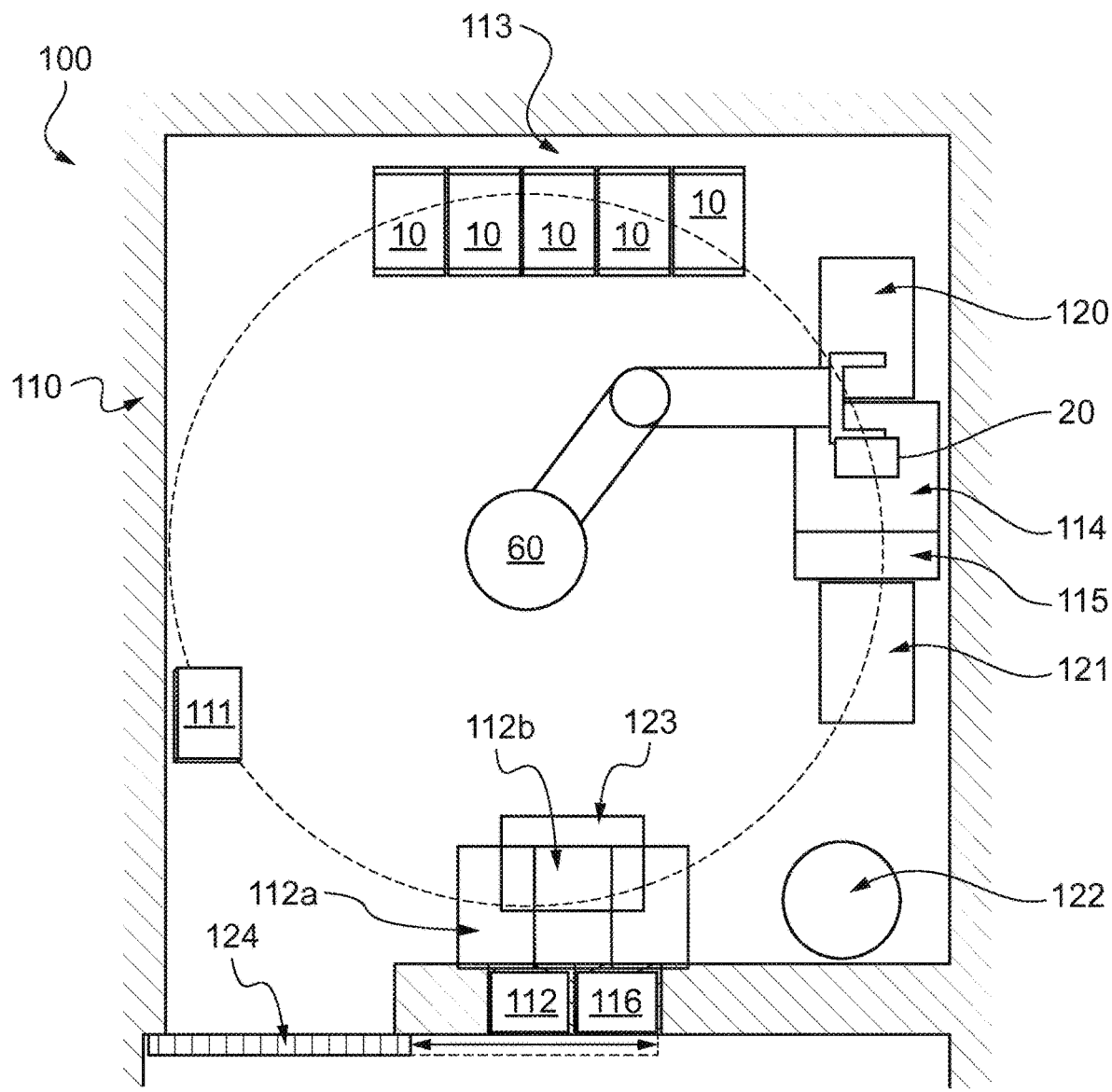

The chamber 10 also comprises a handling interface 16 for a robot (illustrated in FIG. 9), which robot is configured to move the synthesis device 1 into a synthesis room 110 (shown diagrammatically in FIG. 9).

The handling interface 16 is for example provided here in the lateral wall of the cover 12. It is for example a handle, a formation in relief or any other type of grip to which a robot arm may anchor to grasp, hold and move the device.

The materials employed to form the chamber 10 are for example stainless steel (type 316 or 316L), in particular for the mounting 11 for example, and/or of plastic, for example for the cover 12.

Figure 2:
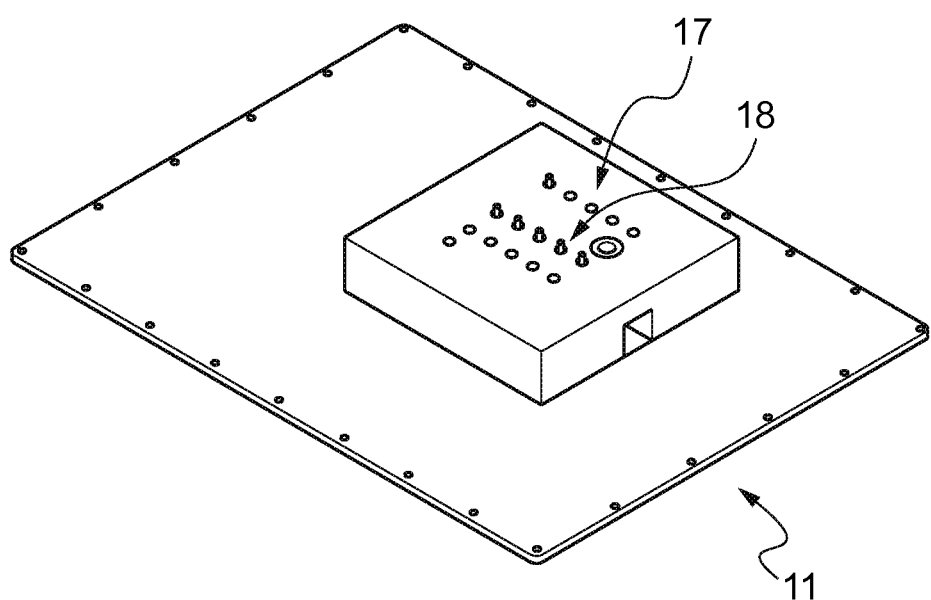
FIG. 2 presents a base of a chamber of the device of FIG. 1 serving as a mounting for various components of the device and comprising an internal connector plate.

FIG. 2 presents the mounting 11, bare, that is to say lacking any component, and in particular different components enabling the synthesis of the radioactive tracer.

The mounting 11 is for example here formed by a planar plate of substantially rectangular shape. At the periphery are holes enabling screwing of the cover 12 to be carried out.

The chamber 10, and in particular here the mounting 11, mainly comprise an internal connector plate 17.

In this example embodiment, the internal connector plate thus forms part of the chamber, or even here part of the wall of the chamber, in this case of the mounting 11.

The internal connector plate 17 is here of substantially parallelepiped shape. It comprises numerous connectors 18 detailed below. The internal connector plate 17 of the mounting 11 is in particular configured to be connected to an external connector plate 20 (visible in FIG. 3) which is fastened to a synthesis station 114 of a room 110 of a synthesis installation 100 (for example shown diagrammatically in FIG. 9).

These connectors 18 form entries and exits of the chamber of the synthesis device 1. They are aligned here in different rows, here principally three rows. For example, one connector enables conveyance of a radioisotope into the cassette; another connector enables extraction of the radioactive tracer, synthesized in the cassette, from the chamber, or even from the synthesis device. For this, these connectors are configured to be connected to the cassette 30 and to be connected to the aforementioned external connector plate 20. A connection between the cassette 30 and the chamber 10 is for example provided by connectors of TEGO D1000 type.

Thus, in other words, the internal connector plate 17 for example enables a connection between the cassette 30, situated inside the chamber, and an outside of the chamber through a wall of the chamber.

Figure 3:
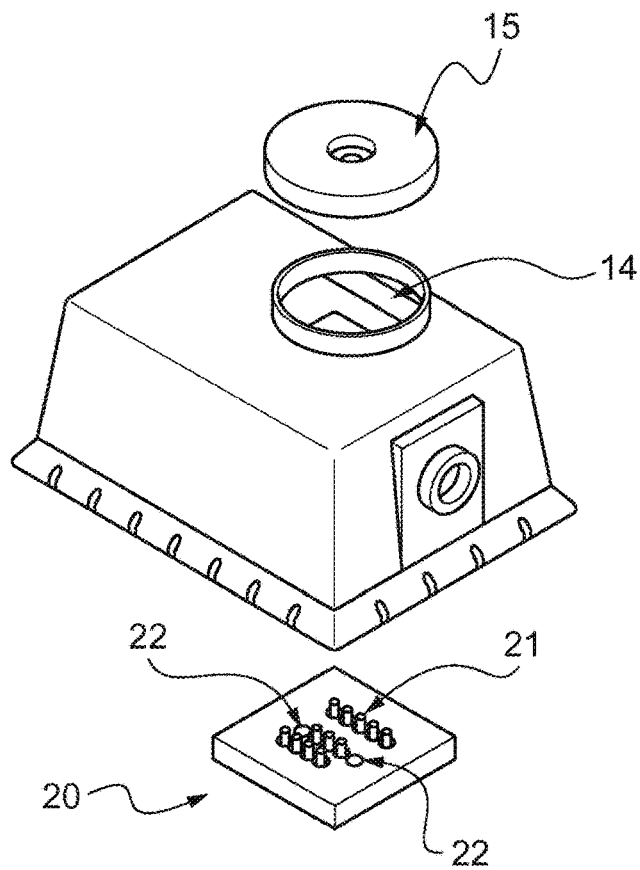
FIG. 3 presents the device of FIG. 1 in open condition for insertion therein of a cassette for synthesis of a radioactive tracer and for its removal therefrom and an external connector plate of a synthesis station of a room of an installation shown diagrammatically in FIG. 9.

FIG. 3 illustrates opening of the access door 13, formed by the opening 14 and the plug 15, as well as an approach (along the arrows) of the chamber 10 of the synthesis device 1 for being positioned and connected to the external connector plate 20 of the synthesis station 114.

The external connector plate 20 for example has a shape similar to that of the internal connector plate 17, i.e. here a substantially parallelepiped shape. Of course, the external plate 20 and the internal connector plate 17 could have any other shape, for example a cylindrical or square or arbitrary shape. The external connector plate 20 comprises several connector tips 21. The connector tips 21 are aligned here in different rows, here three rows, in the manner of the connectors 18 of the internal connector plate 17 of the chamber 10. They jut here from an upper surface of the external plate 20.

In addition to the connector tips 21, the external connector plate 20 comprises two black holes 22 passing through a thickness of the external plate 20 which are configured to form a linking passage of a fluid flow route of the chamber, for example for measuring ambient air in the chamber 10.

Figure 4:
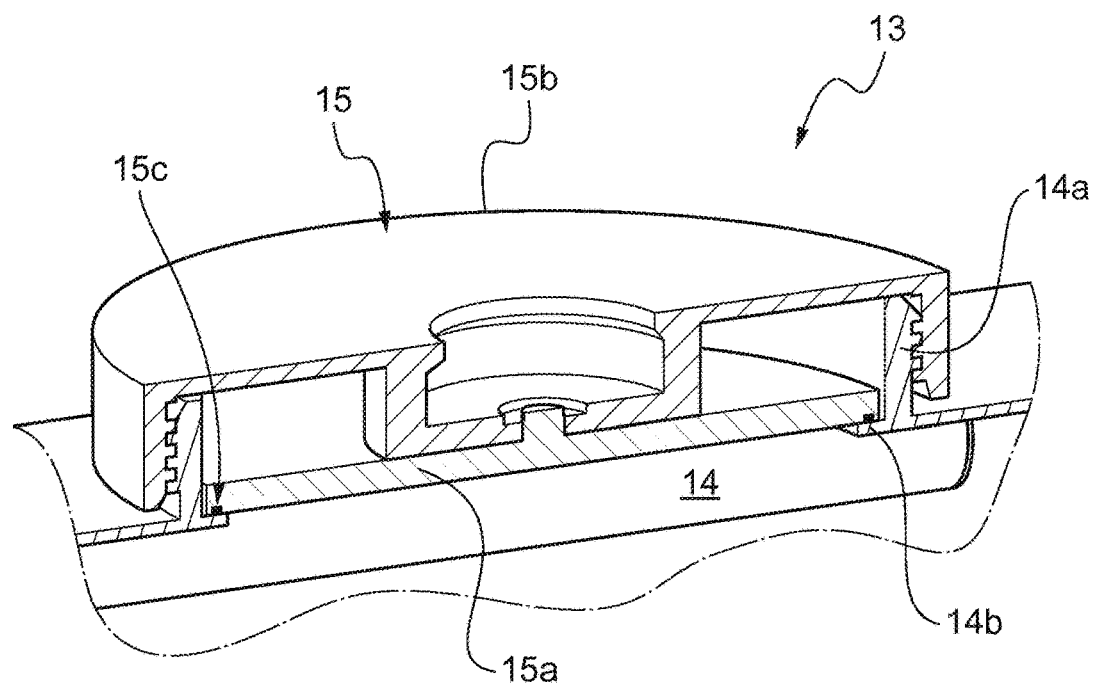
FIG. 4 presents a cross-section view in perspective of a door for access to the chamber of the device comprising an opening in the chamber and a plug.

FIG. 4 details the access door 13 according to the example embodiment of FIG. 3.

The access door 13 is for example open or closed by a manipulation robot 60 (represented in FIG. 9), or by an actuator inside the chamber 10 or by an external actuator used in common for different chambers.

The access door is for example positioned above the internal connector plate 17, or generally facing it, so as to facilitate positioning of the cassette in the chamber, by simple vertical translation, on the internal connector plate 17.

The opening 14, which here purely by way of illustration is circular, comprises a neck 14a which here comprises a screw thread, here over an outside periphery of the neck.

Furthermore, the opening 14 is provided here with a flange 14b configured to serve as a stop for a platform 15a of the plug 15.

The plug 15 comprises, in addition to the platform 15a, a cage 15b.

The platform 15a and the cage 15b are pivotally mounted to each other via an upper wall of the cage.

The cage 15b comprises a lateral wall, here of circular cylindrical shape, which here comprises a screw thread, here over an internal periphery of the lateral wall to be able to cooperate with the screw thread of the neck 14a.

The plug 15 is thus configured such that, when the cage is screwed onto the neck, the platform which enters into contact with the flange remains fixed relative to the flange whereas it turns relative to the cage.

In the present example embodiment, the plug 15, and in particular here the platform 15a, comprises a seal 15c, for example disposed along a contour of the platform 15. Thus, when the platform is in contact with the flange 14b, the seal 15c is taken between the platform and the flange. As the plug is progressively screwed, the seal is thus compressed which contributes to ensuring sealing of the chamber at the location of the access door 13.

According to an embodiment option not shown, the plug 15 is provided with at least one return member, for example one or more helical springs, attached under the plug, for example here to a face of the platform oriented inwardly of the chamber when the plug 15 closes the opening 14. Thus, when a cassette is positioned in the chamber and the chamber is closed, the return member presses on the cassette to improve holding in position of the cassette in the chamber, in particular on the internal connector plate 17.

Other embodiments of the door 13 may of course be envisioned for example such as a sliding window or a pivoting door, etc.

According to still another option, the chamber comprises a jack configured to ensure a join between a cassette and the internal connector plate 17.

By default, the manipulation robot 60 (represented in FIG. 9) itself ensures the positioning and the connection of a cassette to the internal connector plate 17.

Figure 5:
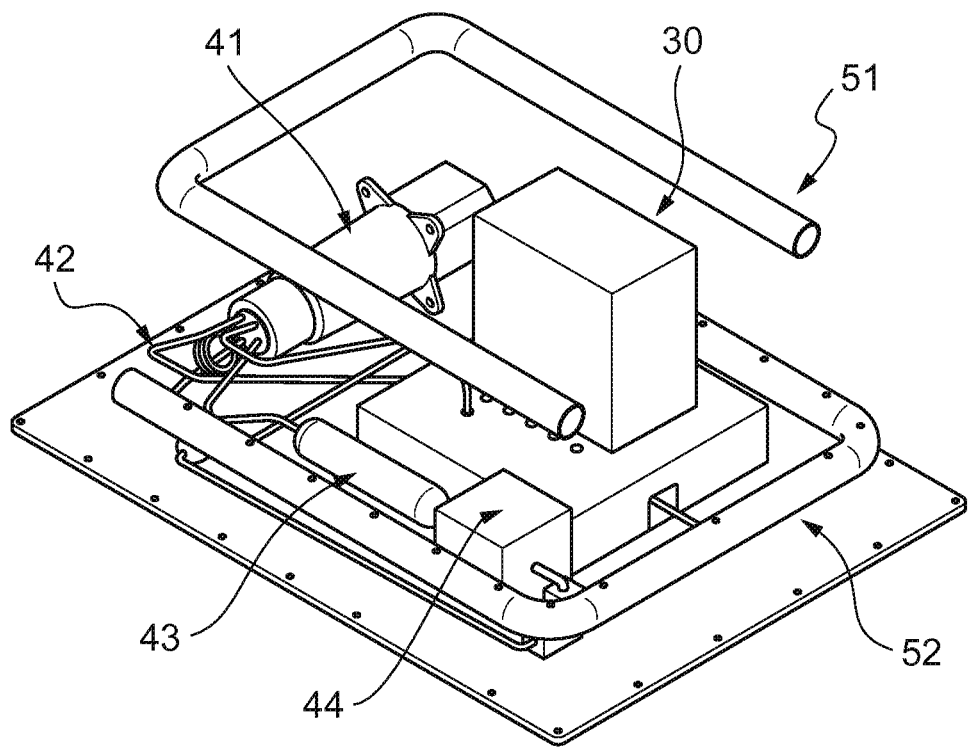
FIG. 5 presents an example embodiment of components disposed in the device and positioned on the mounting presented in FIG. 2.

FIG. 5 now illustrates the different components disposed in the chamber enabling the synthesis of a radioactive tracer.

The synthesis device 1 mainly comprises two flow routes: a chemical synthesis fluid flow route and an aeration flow route.

In the example shown, the aeration flow route comprises a gas suction pipe 51, configured to pump out gas contained in the upper part of the chamber of the synthesis device 1, and a clean gas injection pipe 52 configured to bring clean gas into the lower part of the chamber of the synthesis device 1.

The suction 51 and injection 52 pipes are for example here U-shaped and plugged at their two ends and operate for example like shower pipes.

The injection pipe 52 for example comprises blow holes oriented towards the bottom of the device to place possible deposits of particles in suspension.

The clean gas injected is for example nitrogen (N) or argon (Ar), but any other inert gas could be suitable.

The suction pipe 51 and the injection pipe 52 are connected to the internal connector plate 17 by hoses. They are thus connected, through the external connector plate 20, to pumps situated outside the chamber, upstream and/or downstream according to a direction of flow of the gases.

One pump may suffice to suck out the air contained in the chamber and, therefore, to suck in clean gas.

A pump makes it possible for example to create measured reduced pressure in the chamber. This reduced pressure is for example checked by a pressure sensor. The use of two possible flow rate measuring devices, one upstream and one downstream, makes it possible both to measure the flow rate of air which passes through the chamber and the pressure in the chamber.

The use of a possible filter, for example of H14 type, at the entry ensures sufficient air purity to establish air of Class A quality. Advantageously, an additional independent loop enables the particular, possibly radiological, measurement of the air. The pumping out from that loop is for example ensured by the particular counter itself.

In the example represented, the fluid flow route mainly comprises in series a valve 41, hoses for passage of fluid 42, a radioactive tracer purification module 43, comprising for example an HPLC column, and a shielded detector 44.

The valve 41 is here an injection valve making it possible to uncouple the low pressure flow routes (the cassette for example) and high pressure flow routes (the HPLC column for example); it is for example a Rheodyne (A) type 6.2 valve (6 ports 2 positions) with an injection loop (a volume of less than one ml in practice). It is for example an electrically motorized valve (24V (volts) direct current (DC), 8 wires).

The valve 41 is connected to the internal plate 17 via hoses.

The hoses 42 further optionally comprise for example two non-return valves and/or a 3-way (3W). valve.

The detector 44 is configured to detect a possible peak in radioactivity arising from the purification. It also for example drives the actuation of a 3W valve just after to enable the extraction of the peak representing the purified product.

The waste is removed from the chamber by one of the connectors provided on each of the plates.

The synthesis device 1 also comprises the synthesis cassette 30, which is a consumable, that is to say single-use, unit. When it is positioned in the chamber 10, the cassette 30 is mounted in series in the fluid flow route, in particular by virtue of the internal connector plate 17.

Figure 6:
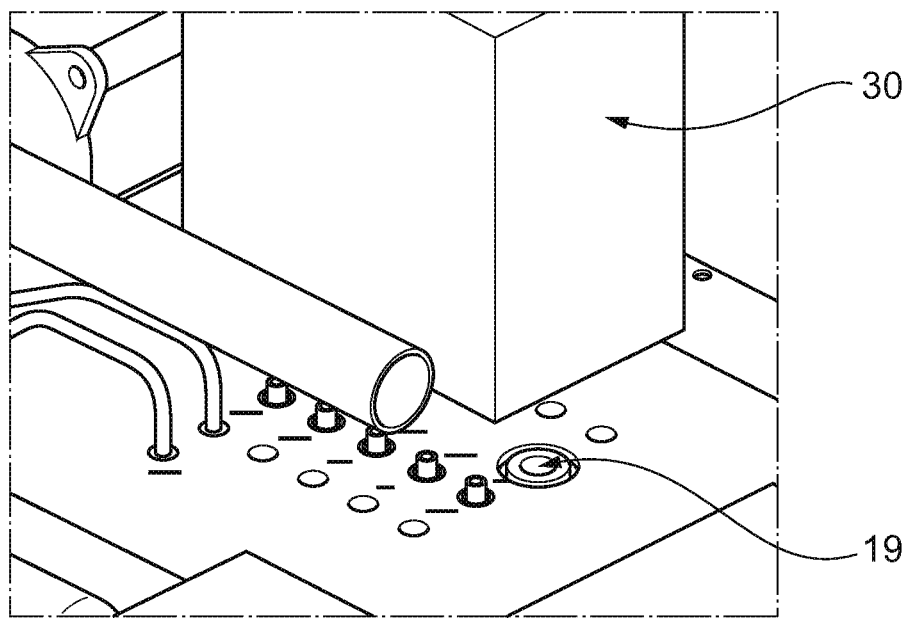
FIG. 6 illustrates an approach of the cassette for it to be connected with an internal connector plate of the device.

FIG. 6 shows in more detail the positioning of the cassette 30 on the internal connector plate 17 for its fluidic connection with the external connector plate 20.

In particular, the external plate 20 and the internal connector plate 17 are configured to enable the connection of a syringe (not shown). An aperture of the internal connector plate 17 dedicated to that end is for example surrounded by a seal 19, for example an 'O' ring seal, enabling sealing between the cassette 30 and the internal connector plate 17 to be reinforced.

Figure 7:
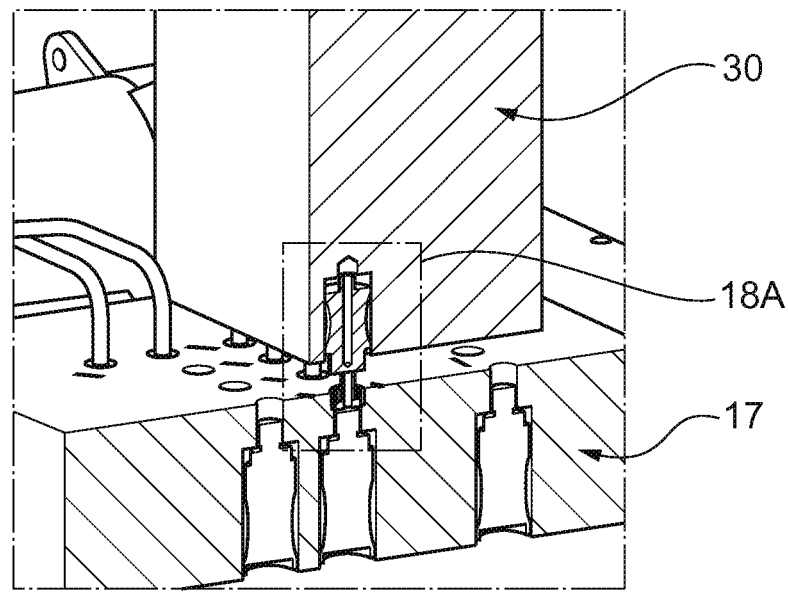
FIG. 7 presents a first cross-section view of a connection between the cassette and the internal connector plate of the device.
Figure 8:
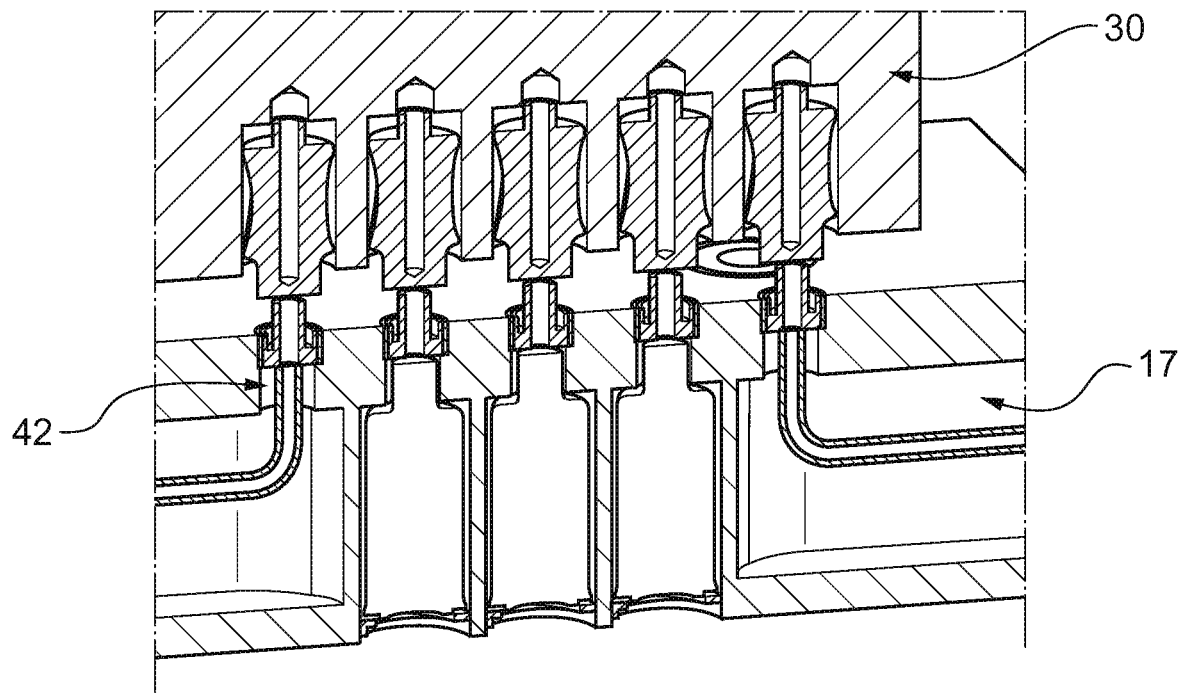
FIG. 8 presents a second cross-section view, in a plan orthogonal to that of FIG. 7, illustrating the connections between the cassette and the connector plate of the device, FIG. 9 diagrammatically illustrates an example arrangement for a synthesis installation in which different radioactive tracers may be synthesized using a device according to the invention.

In other views, FIGS. 7 and 8 illustrate a connection between the cassette 30 and the internal connector plate 17 by virtue of what is referred to as a parent connector situated in the cassette 30 and what is referred to as a child connector situated in the internal connector plate 17. The combination of these connectors is, in FIG. 7, designated under the reference 18B.

Thus, for example, the radioisotope is injected via the external connector plate 20 and the internal plate 17 in the cassette 30. The radioactive tracer obtained at the exit of the cassette passes into the hoses 42, then into the HPLC column 43 for purification then into the detector 44. At the exit from the detector 44, it passes through a valve on leaving which one part returns to the cassette 30 for possible final steps (including for example sterilizing filtration and possible formulation) then is placed in a syringe; the other part goes to a waste bin via the plates.

Thus, such a synthesis device makes it possible to synthesize different radioactive tracers by virtue of a chamber of universal architecture in which is disposed a cassette specific to the radioactive tracer to synthesize, on the basis of the radioisotope injected at the entry.

FIG. 9 presents an example arrangement for an installation for synthesis of at least one radioactive pharmaceutical according to the invention, denoted 100 overall.

The installation 100 comprises a fluid-tight room 110 in which is principally disposed a set of chambers 10 of synthesis devices 1 as described above in a storage space 113 and a manipulation robot 60, substantially positioned here in the middle of the room 110.

The advantages of using a robot are linked to the diversification application and to the sterile devices or to the quality assurance procedures. Furthermore, as the staff have less need to be present, they are less exposed to the ionizing radiation; this makes it possible not necessarily to have to shield each chamber, which enables cost reductions to be made.

Indeed, hitherto, a robot was not necessary since there was always the same radioactive tracer, and therefore one line sufficed for the reactions.

On account of the plurality of markers, either the devices remain in the same location and the fluids are conveyed thereto, or the devices are themselves moved (solution adopted in the present example embodiment) on the basis of pre-established routing for the fluids (that is to say principally the radioisotope and the cassette).

For this, the robotization here concerns a robot 60 configured to move the chambers 10 of synthesis devices as well as the other components concerned in the room 110 automatically.

The robot 60 is for example a 6-axis robot arm.

The robot 60 is thus here configured to dispose one of the chambers 10 at a predetermined location to fluidically connect it to an external source of at least one radioisotope, for example a target holder situated in a room, which may for example be adjacent, in which is also disposed a cyclotron, enabling the radioisotope to use to be obtained.

For this, the robot 60 takes a chamber 10 from its storage space 113 and positions it on the synthesis station 114.

It is the synthesis station 114 which comprises the external connector plate 20 described above. The synthesis station 114, like the external connector plate 20, is fixed in the room 110.

The external connector plate 20 is linked by several pipes, or capillaries, to different sources of radioisotopes situated outside the room 110. This may be target holders, but also generators (in particular for $^{68}Ga$) or even a supply zone into which radioisotopes generated at a distance from the room are conveyed. It for example comprises one pipe per radioisotope, and therefore one entry per pipe conveying a given radioisotope.

The connection between the selected chamber 10 and the synthesis station 114, more specifically the external connector plate 20, is provided either by motorization (and an endless screw for example), or by another grasping mechanism, for example of the type designed and produced by the company Staubli.

Furthermore, the robot 60 is configured to insert a synthesis cassette 30 into the chamber 10 and is furthermore configured to add on a syringe thereto.

For this, the cassette 30 is supplied by a practitioner, present outside the room 110, through an access window 112.

To insert the cassette 30 into the chamber 10, the robot 60 retrieves the cassette 30 at the access window 112 (this is preferably an airlock), unscrews the plug 15 of the chamber 10, inserts and positions the cassette 30 by passing it through the opening 14 and screws the plug 15 back onto the opening 14.

After use, that is to say after the synthesis of the radioactive tracer from the appropriate radioisotope, the robot unscrews the plug, withdraws the cassette and throws it into a recycling bin for solid waste 111.

The robot 60 is also, for example, configured to add on a syringe (possibly provided with shielding), for example also supplied by the practitioner by the same access window 112.

The access window 112 here enables not only the entry of syringes into the room but also of new consumables (cassettes); the zones for reception of these syringes and of these consumables may be differentiated.

Once the radioisotope and the cassette in the chamber are positioned on the synthesis station, a radioactive tracer is generated and placed in the syringe at a syringe filling station 115 linked to the external connector plate 20.

The connection between the syringe and the cassette is made at least by the internal connector plate 17, or even by the external connector plate 20 then the internal connector plate 17. As indicated previously, the sealing of the chamber is advantageously provided by an 'O'-ring seal 19, for example place around a TEGO D1000 connector.

The connection/disconnection movement is for example provided by a syringe filling automaton which uses a vertical translation movement, in particular because this more simply enables a possible presence of air bubbles in the syringe to be avoided.

The quality of the radioactive tracer contained in the syringe is controlled and, subject to the control being positive, that is to say in accordance with expectations and specifications, the syringe is provided to the practitioner by the robot 60, outside the room, via an exit window 116 (preferably an airlock) enabling a zone to be accessed which in practice is distinct from the zones 112a and 112b.

The access and exit windows are adjacent here but may, as a variant, be situated at the two ends of the room when, for example, the robot has a narrow and elongate ambit of action.

In general, one part of the radioactive tracer coming from the synthesis device 1 goes into the syringe and another part goes to quality control.

The sampling for the quality control may be provided, in practice, outside the room, in several ways, for example:
- By the syringe filling automaton by filling a sampling syringe. This sampling syringe may then be either given to a user who uses it to perform various quality control operations, or is automatically injected into an automaton performing all the quality control operations.
- By use of a transfer line (for example of capillary type) between a quality control module of and the chamber enabling transfer of fluid between them. The quality control module may then possibly comprise the aforementioned quality control automaton.

The quality control module is for example an independent module outside the room 110 which is applicable for all the radioactive tracers.

Such an installation thus makes it possible to provide a solution which is compact, light, autonomous and reliable (without danger; for example in all circumstances, the robot acts in secure mode (electrical power cut, erroneous manipulations etc.)) since the practitioner provides his product (the cassette and in practice the syringe when this is useful) and everything operates automatically.

The room may further comprise a box for fluids 120, a module 121 here called CH3I (that is to say a module here producing iodomethane by transformation of $CO_2$ or of $CH_4$), a liquid waste collection station 122, a maintenance zone 123 preferably near the access and exit windows 112 and 116. In the example shown, an door 124 for access to the room is mounted slidingly so as to block the access to the windows in open configuration.

The inside of the room is maintained in Class C, with reduced pressure which is, for example, ideally between −35 Pa and −45 Pa, but the reduced pressure may be lower (−20 MPa), the reduced pressure may be different inside the transfer airlocks, for example +15 Pa and −25 Pa.

By virtue of such a device and such an installation, a radioactive tracer is for example obtained in the following way:
- A chamber 10 of a device 1 is positioned on the synthesis station 114 by the manipulation robot 60;
- The internal connector plate 17 of the synthesis device is connected with the external connector plate 20 of the synthesis station 114;
- A synthesis cassette 30 of the radioactive tracer, provided in advance by a practitioner via the window 112, is inserted into the chamber 10 by the robot 60;
- A radioisotope conveyed from a source positioned outside a room 110 of the installation 100 is injected into the synthesis module of the cassette 30;
- The radioactive tracer is synthesized in a synthesis module of the cassette 30 from the radioisotope and reagents contained in the cassette 30; and
- The radioactive tracer is extracted from the device, or even is placed in a syringe if the practitioner has supplied one, for example by virtue of the syringe filling module.

If necessary, the radioactive tracer is diluted in a product that is injectable into humans, for example physiological saline solution, for example before being extracted or placed in a syringe.

The syringe is for example connected to the exit of the external connector plate 20 of the synthesis station 114.

Lastly, the quality of the radioactive tracer at the exit of the external connector plate 20 of the synthesis station 114 is controlled by the quality control module.

Figure 10:
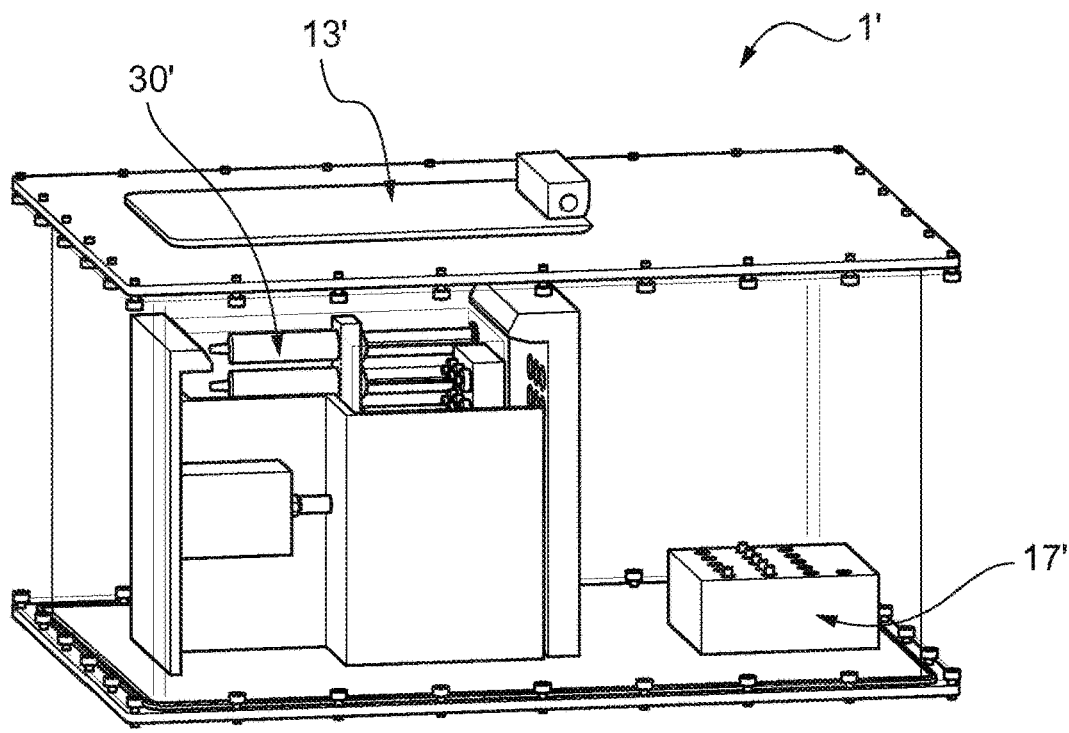
FIG. 10 presents an inside view in perspective of a device according to another example embodiment.
Figure 11:
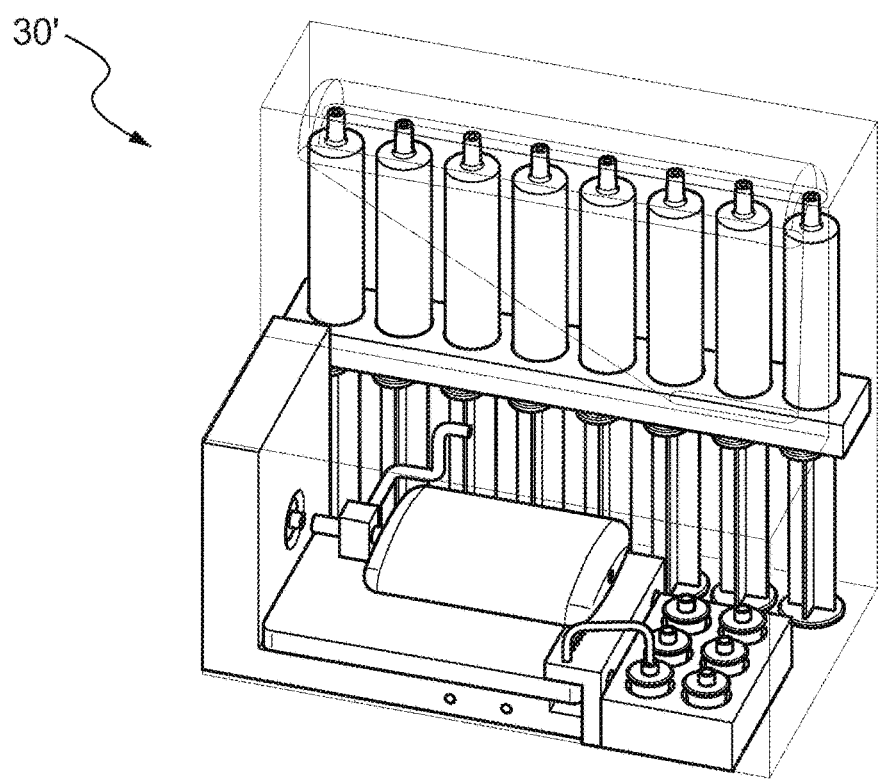
FIG. 11 presents an example embodiment of a cassette.

By way of example, FIGS. 10 and 11 present other embodiments of a synthesis device 1' and of a synthesis cassette 30'.

Similar parts to those described above bear the same reference surmounted by a "prime" sign and are therefore not described again.

This example embodiment differs in particular from the previous one in that the access door 13' is now formed by a gate which retracts, and principally in that the internal connector plate 17' is constituted here from several parts, in particular here two parts: one part referred to here as "vertical" on which is connected the cassette 30' when the latter is positioned in the chamber and one part referred to here as "horizontal", relatively fixed on the wall of the chamber, here a base of the chamber, as previously.

The different parts constituting the internal connector plate, here the two aforementioned parts, are connected by different cables and/or capillaries, not shown here in the interest of clarity in FIG. 10.

Thus, generally, the internal connector plate comprises a minima a part providing a link between the cassette inside the chamber and other members outside the chamber (for example such as the external connector plate or other members).

Naturally, the present invention is limited neither to the preceding description nor to the appended drawings, but encompasses any variant form within the capability of the person skilled in the art.

The different features presented may be advantageously combined. Their presence in the description does not, indeed, exclude the possibility of combining them.

The terms "comprising" or "having" are to be interpreted here as "including" in the broad sense and not limitatively, exclusively or exhaustively.

The invention claimed is:

1. A device (1) for synthesizing a radioactive tracer from a radioisotope, comprising:

a cassette (30) for specific synthesis of the radioactive tracer; and a universal confined chamber (10) comprising an internal connector plate (17) and in which is provided an access door (13) configured for insertion therein of the cassette (30) and for removal of the cassette therefrom, said cassette (30) comprising reagents and a synthesis module, the synthesis module comprising a reaction cell and being configured to receive the reagents and the radioisotope for synthesizing the radioactive tracer, the synthesis module being fluidically connected to an entry of the cassette that is configured for conveying the radioisotope into the reaction cell and an exit from the cassette configured for delivering the radioactive tracer out of the cassette (30), and said internal connector plate enabling a connection between the cassette and an outside of the chamber through a wall of the chamber when the cassette is situated inside the chamber, said internal connector plate (17) comprising at least one entry configured to connect the entry of the cassette to an ingress of the radioisotope, and also comprising an exit configured to be connected to the exit of the cassette and to extract the radioactive tracer out of the chamber.

2. The device according to claim 1, further comprising:
a gas suction pipe (51), configured to pump out a gas contained in the chamber (10) in the upper part of the device (1).

3. The device according to claim 2, wherein the gas suction pipe (51) is fluidically connected to the internal connector plate (17) of the device (1).

4. The device according to claim 1, further comprising:
a clean gas injection pipe (52), configured to bring clean gas into the chamber (10) in the lower part of the device (1).

5. The device according to claim 4, wherein the clean gas injection pipe (52) is fluidically connected to the internal connector plate (17) of the device (1).

6. The device according to claim 1, wherein the cassette (30) comprises a module for pre-treatment of the radioisotope.

7. The device according to claim 1, further comprising:
a radioactive tracer purification module (43) located within the universal confined chamber (10) and mounted in series after the cassette (30) by means of the internal connector plate (17), for purifying the radioactive tracer delivered out of the cassette (30).

8. The device according to claim 1, further comprising:
an external system for managing the quality of the gas in the chamber.

9. The device according to claim 8, wherein the system for managing the quality of the gas in the chamber comprises a pump configured to create a pressure reduction in the chamber and a pressure sensor configured to measure the pressure reduction.

10. The device according to claim 8, wherein the system for managing the quality of the gas in the chamber comprises a flow rate measuring device upstream of the chamber and a flow rate measuring device downstream of the chamber which are configured to measure both a flow rate of gas which passes through the chamber and a pressure in the chamber.

11. The device according to claim 8, wherein the system for managing the quality of the gas in the chamber comprises a filter, upstream of the chamber, configured to ensure Class A air purity.

12. The device according to claim 8,
wherein the system for managing the quality of the gas in the chamber comprises an independent measurement loop configured to perform a measurement of the air in the chamber, and
wherein the measurement loop comprises a counter configured to perform pumping out of the loop.

13. An installation (100) for synthesis of at least one radioactive tracer comprising synthesis devices (1) according to claim 1 and a confined room (110), comprising:
an area (113) for storage of at least two chambers (10) of the synthesis devices (1), which are empty and identical;
at least one window (112, 116) for communication between an inside and an outside of the room (110), configured for a practitioner to supply at least one cassette (30) for synthesis of the radioactive tracer of the synthesis device (1); and
a manipulation robot (60) configured at least to sample one of the chambers (10) and the synthesis cassette (30), bring them onto a synthesis station (114), and associate them to form the synthesis device (1),
the synthesis station (114), fixed in the room (110) and configured to receive the synthesis device (1), comprising an external connector plate (20), that is configured to receive the internal plate (17) of the chamber (10) of the synthesis device (1), comprising at least one entry configured to convey a radioisotope into the synthesis cassette (30) and an exit configured to connect thereto a syringe to fill with the radioactive tracer, and
an ingress of radioisotope coming from a source situated outside the room and connected to the entry of the external connector plate (20).

14. The installation according to claim 13, wherein the room (110) comprises an external module for quality control of the synthesized radioactive tracer.

15. The installation according to claim 14, wherein the module for quality control is fluidically connected to the exit of the external connector plate (20) of the synthesis station (114).

16. The installation according to claim 13, further comprising:
a system for managing ambient air of the room.

17. A method for obtaining a radioactive tracer in the installation (100) according to claim 13, comprising the following steps:
a step of positioning a chamber (10) of the synthesis device (1) on the synthesis station (114) of the installation (100) by the manipulation robot (60);
a step of connecting the internal connector plate (17) of the chamber (10) of the synthesis device (1) with the external connector plate (20) of the synthesis station (114);
a step of inserting a cassette for specific synthesis (30) of the radioactive tracer into the chamber (10) of the synthesis device (1) by the robot (60), the cassette (30) being supplied in advance by the practitioner via the window of the installation (112), thus forming the synthesis device (1) of the installation (100);
a step of providing the radioisotope conveyed from a source positioned outside the room (110) of the installation (100) into the synthesis module of the cassette (30);
a step of synthesizing the radioactive tracer in the synthesis module of the cassette (30) from the radioisotope and from reagents contained in the cassette (30); and a step of extracting the radioactive tracer from the synthesis device (1).

18. The method according to claim 17, further comprising:
a step of sterilizing filtration and/or dilution/formulation of the radioactive tracer into a product injectable into humans.

19. The method according to claim 17, further comprising:
a step of connecting the syringe to the exit of the external connector plate (20) of the synthesis station (114), and
a step of placing the radioactive tracer from the device (1) into the syringe.

20. The method according to claim 17, further comprising:
a step of quality control of the radioactive tracer at the exit from the external connector plate (20) of the synthesis station (114) by a quality control module situated outside the room.

21. A device (1) for synthesizing a radioactive tracer from a radioisotope, comprising:
a cassette (30) configured for specific synthesis of the radioactive tracer; and
a universal confined chamber (10) comprising an internal connector plate (17) and in which is provided an access door (13) configured for insertion therein of the cassette (30) and for removal of the cassette therefrom,
said cassette (30) comprising reagents and a synthesis module,
the synthesis module comprising a reaction cell and being configured to receive the reagents and the radioisotope for synthesizing the radioactive tracer, the synthesis module being fluidically connected to an entry of the cassette that is configured for conveying the radioisotope into the reaction cell and an exit from the cassette configured for delivering the radioactive tracer out of the cassette (30),
said internal connector plate (17) being configured to interface with the cassette when the cassette is situated inside the chamber, and comprising at least one entry configured to connect the entry of the cassette to an ingress of the radioisotope, and also comprising an exit configured to be connected to the exit of the cassette and to extract the radioactive tracer out of the chamber, and
a radioactive tracer purification module (43) located within the universal confined chamber (10) and mounted in series after the cassette (30) by means of the internal connector plate (17), for purifying the radioactive tracer delivered out of the cassette (30).

* * * * *